March 23, 1965  H. P. RAMAN  3,174,999
METHOD OF SEPARATING NITRO-SUBSTITUTED-CHLORO-BENZOIC ACIDS
Filed Feb. 8, 1963  5 Sheets-Sheet 1

INVENTOR.
HARVEY P. RAMAN
BY
Caesar and Rivise
ATTORNEYS.

INVENTOR.
HARVEY P. RAMAN

March 23, 1965 H. P. RAMAN 3,174,999
METHOD OF SEPARATING NITRO-SUBSTITUTED-CHLORO-BENZOIC ACIDS
Filed Feb. 8, 1963 5 Sheets-Sheet 5

INVENTOR.
HARVEY P. RAMAN
BY
Caesar and Rivise
ATTORNEYS.

3,174,999
METHOD OF SEPARATING NITRO-SUBSTITUTED-CHLORO-BENZOIC ACIDS
Harvey P. Raman, Philadelphia, Pa., assignor to Amchem Products, Inc., Ambler, Pa., a corporation of Delaware
Filed Feb. 8, 1963, Ser. No. 257,259
3 Claims. (Cl. 260—525)

The present invention relates to a process for the separation of isomers of nitro-substituted benzoic acids. More particularly, the present invention relates to a novel process for recovering 2,5-dichloro-3-nitrobenzoic acid from crude nitration mixtures of various chloro-substituted benzoic acids.

2,5-dichloro-3-nitrobenzoic acid possesses outstanding herbicidal selectivity in that it may be employed, as is taught in United States Patent No. 3,013,873, for the eradication of both narrow and broad leaf weeds from economically desirable crops. Moreover, this acid in substantially pure form is an excellent starting material for the production of 2,5-dichloro-3-aminobenzoic acid, the latter compound also being a valuable herbicide as is disclosed in United States Patent No. 3,014,063.

The preferred commercial method for preparing 2,5-dichloro-3-nitrobenzoic acid involves the nitration of an admixture of chlorinated benzoic acids, which admixture is rich in the 2,5-dichloro-isomer. During the nitration reaction various nitro-chloro-substituted isomers are obtained. For example, in addition to the desired 3-nitro isomer, the 4- and 6-mono-nitro isomers are obtained, as also are one or more of the 3,5-, 3,6- or 4,6-dinitro isomers. This problem of isomer production is very difficult to control under commercial production practices, and the problem is compounded when the original benzoic acid admixture contains a number of chlorinated acids in appreciable amounts over and above the desired 2,5-dichloro isomer.

The most prevalent compound beyond the desired 3-nitro isomer produced during the nitration of 2,5-dichloro-benzoic acid is the corresponding 6-nitro product. This particular compound has been found to cause serious injury to certain economic crops when it is present in formulations of 2,5-dichloro-3-nitrobenzoic acid employed for herbicidal purposes. For example, use of technical grade 2,5 - dichloro - 3 - nitrobenzoic acid, obtained from a commercial nitration reaction such as hereinabove described, has produced erratic results with serious crop damage when this technical grade of the herbicide acid was applied to soybeans, squash or snapbeans.

Attempts to separate the undesirable isomers, particularly the 6-nitro compound, from 2,5-dichloro-3-nitrobenzoic acid using standard methods of fractional crystallization and/or solvent extractions have not been feasible on a commercial scale. Excessive costs mitigate against solvent extractions, while fractional crystallization techniques require involved, time consuming operations. Moreover, although these techniques are relatively successful in ultimately separating the undesirable nitro isomers, they do not remove unnitrated benzoic acids, so that the latter constituents, even if not detrimental from a herbicidal use viewpoint, constitute essentially inert bulk and are undesirable for this reason.

It is thus desirable to obtain a high purity fraction of 2,5-dichloro-3-nitrobenzoic acid, and that such fraction contain little or no isomeric components, particularly with respect to harmful components.

With the foregoing in mind the principal object of the present invention may be said to reside in the provision of a novel process for separating mixed isomers of nitro-substituted-chloro-benzoic acids by an economical and a commercially feasible method.

A concomitant object of this invention resides in the provision of a process for separating and recovering high quality 2,5-dichloro-3-nitrobenzoic acid from crude nitration admixtures of related isomers without the need of employing solvent extraction or fractional solvent crystallization practices.

These and other objects of the invention will become more apparent as the following description proceeds in conjunction with the accompanying drawings, wherein.

Figure 1:
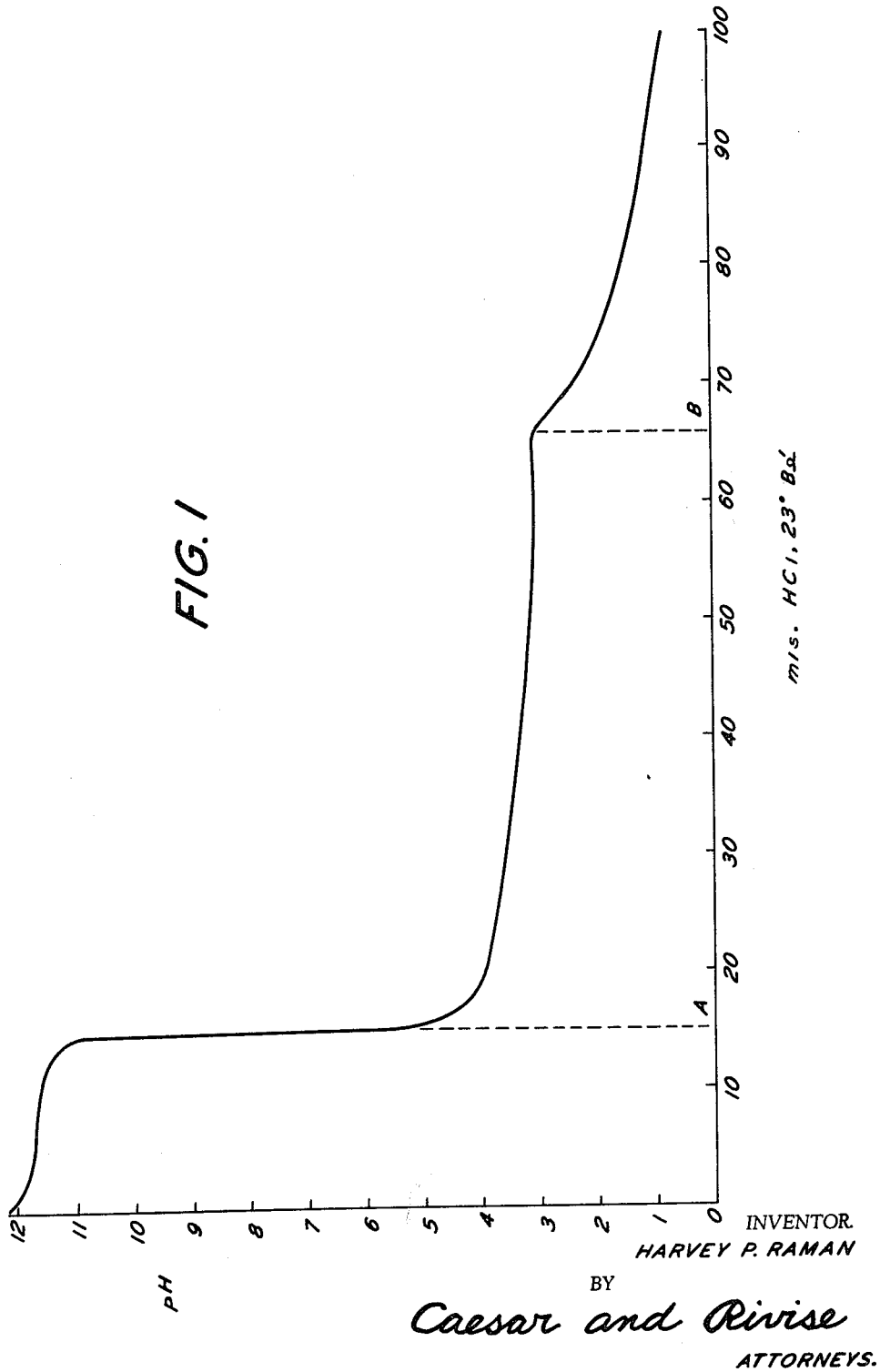
FIG. 1 is a graph which illustrates in visual form the slope of a curve obtained from plotting the pH of an alkaline solution of mixed, crude chloro-nitrobenzoic acid isomers vs. the mls. of 23° Bé. hydrochloric acid used as the acidifying media to precipitate 2,5-dichloro-3-nitrobenzoic acid.

The present invention is based upon the discovery that an aqueous fractional precipitation of a crude admixture of nitrated isomers of chlorinated benzoic acids if operated within certain controlled degrees of acidity and alkalinity, results in the separation and recovery of isomeric products, which products are of sufficiently high purity so as to require essentially no further purification prior to use.

It has been surprisingly discovered that if a crude nitration admixture of chlorinated benzoic acids is dissolved in aqueous alkali, the pH of the solution being at least 10, as determined by standard glass electrodes, there is an immediate precipitation of the 3,4-dichloro-6-nitrobenzoic acid isomer as the crystalline metal salt corresponding to the alkaline media, and that if the alkaline filtrate resulting from the separation of the 3,4-dichloro-6-nitro isomers is subsequently acidified with mineral acid to a pH range between 2 and 4, there occurs a precipitation of the 2,5-dichloro-3-nitrobenzoic acid in high quality and yield, and that if the acidic filtrate, resulting from the recovery of the crystalline 2,5-dichloro-3-nitro isomer, is then further acidified with mineral acid to a pH of below 1, an oily organic phase consisting primarily of the 2,5-dichloro-6-nitrobenzoic acid isomer separates from the acidic aqueous phase.

The initial dissolution of the crude nitrated-chloro substituted benzoic acids must, as noted hereinabove, be in an aqueous alkaline solution at a pH of at least 10 in order to precipitate the substantially insoluble alkali metal salt of 3,4-dichloro-6-nitrobenzoic acid. While the use of conventional alkaline systems such as for example sodium, potassium or ammonium hydroxides have been found to be suitable for use in the process of this invention, the preferred alkaline agent is sodium hydroxide for the reasons that the sodium salt of 3,4-dichloro-6-nitrobenzoic acid possesses a lower order of solubility than do the corresponding ammonium or potassium salts, and also in view of the more favorable ecomonics associated with the use of commercial sodium hydroxide solutions.

As noted hereinabove, pH of the alkaline solution must be at least 10 in order to insure complete dissolution of the organic acids as the alkali metal salts thereof, while simultaneously insuring the precipitation of the undesirable 3,4-dichloro-6-nitro isomer. While this lower pH limit of 10 is critical with respect to the satisfactory operation of the process of this invention, there does not appear to be any upper limit so far as pH is concerned. For example, use of sufficient alkaline constituents to provide a pH of 12, or even as high as 14 has produced completely satisfactory results.

A preferred practice with respect to the amount of alkaline constituent which is to be employed comprises utilizing from about 1.02 to about 1.2 mols of alkali for each mol of total acids present in the crude nitration admixture, at the same time insuring that the solution pH is at least 10.

After conversion of the organic acids to their soluble alkali metal salts, the 3,4-dichloro-6-nitrobenzoic acid component is precipitated as crystalline product in the form of its alkali metal salt. This product may be recovered by filtration, and the filtered crystals are preferably washed with dilute alkaline solution to remove soluble salts of the various benzoic acid isomers. The corresponding acid may be recovered by acidification according to standard procedures, and the resulting product may be washed with cold water and dried to yield high quality 3,4-dichloro-6-nitrobenzoic acid having a M.P. of 164–166° C. (literature=164–166° C.), a NE of 236 and a purity of 99% or higher.

The alkaline filtrate resulting from the recovery of the substantially insoluble salt of the 3,4-dichloro isomer, as hereinabove described, is then acidified with mineral acid to a pH below 4, but not below 2, whereupon the desired, herbicidally active 2,5-dichloro-3-nitrobenzoic acid fraction is precipitated in high quality and yield.

The type of mineral acid employed for this acidification stage is not critical, and may be selected from the group consisting essentially of hydrochloric, nitric, sulfuric and phosphoric acids. Preferred acids, from handling and cost viewpoints, are hydrochloric and sulfuric.

After precipitation of the desired 2,5-dichloro-3-nitrobenzoic acid isomer, between a pH range of 2 to 4, the crystalline product is recoverable by any convenient means, preferably by filtration. These crystals are then washed with mildly acidic aqueous solution to free them of any soluble components, and are then water washed and dried to yield a very high quality product melting at 208–212, having a neutralization equivalent of 236 (theory 236) and a purity in excess of 90%.

The crystalline 2,5-dichloro-3-nitrobenzoic acid resulting from this process is suitable for use, without any further purification, in herbicidal applications. This product also provides an excellent raw material for the preparation of the corresponding 2,5-dichloro-3-aminobenzoic acid.

If desired, the acidic filtrate from the recovery of the 2,5-dichloro-3-nitrobenzoic acid may be acidified further, to a pH below 1, in order to recover an oily organic phase consisting primarily of the 2,5-dichloro-6-nitrobenzoic acid isomer. While this particular isomer is undesirable when combined with the 2,5-dichloro-3-nitro isomer for use in herbicidal applications, due to its lack of specificity or selectivity of action, it has definite herbicidal properties and may be employed as a general or overall vegetation herbicidal agent.

Cooling of this oily organic layer results in crystallization of the 6-nitro isomer. After water washing and drying, a crystalline product is recovered having a melting point of about 136° C. (141–143 for pure product). This crystalline fraction is of sufficiently high quality for reduction to the corresponding 6-amino compound, the latter being useful as an intermediate in chemical syntheses, particularly in the dyestuffs industry.

In order to illustrate the novel process of the present invention, the following detailed example is presented, but is not to be construed as in any way limiting the scope of this invention.

236 gms. (1 mol) (acid equivalent) of a crude admixture of nitrated isomers of chlorinated benzoic acids were added to 1000 ml. of water, and 50% sodium hydroxide was added thereto, with stirring until the solution pH was 10.2. (88 mls. being required). The alkaline solution was stirred for 15 minutes and then filtered to remove the precipitated 3,4-dichloro-6-nitrobenzoic acid isomer as its sodium salt.

The alkaline filtrate was then acidified with 23° Bé. hydrochloric acid to a pH of 2.9 whereupon precipitated crystals were recovered by filtration. The recovered crystals were washed with dilute hydrochloric acid and then with water. The wet cake was then dried and the resulting product was found to be 2,5-dichloro-3-nitrobenzoic acid having a neutralization equivalent of 236 (vs. theory of 236), a melting point of 208–212° C. (vs. literature value of 220° C.) and a purity in excess of 93%. The filtrate resulting from the recovery of the 2,5-dichloro-3-nitrobenzoic acid was acidified to a pH of 0.5 using 23° Bé. hydrochloric acid. An oily organic layer separated from the lower aqueous phase and was recovered and cooled in an ice bath to yield crude crystalline 2,5-dichloro-6-nitrobenzoic acid.

The graph of FIG. 1 was obtained by plotting pH vs. mls. of 23° Bé. hydrochloric acid used in this run. Points A and B on the curve show, respectively, the points where 2,5-dichloro-3-nitrobenzoic acid began and ceased to be precipitated from the acidic solution.

A sample of the crude nitration admixture employed above was converted to the methyl esters of the acid components using diazomethane, and was subjected to gas chromatographic analysis using an F & M Model 500 instrument with Model 1609 flame ionization detector attachment, and employing a Minneapolis-Honeywell (Y 143) Recorder 2 min./inch and having a Disc Integrator. A 3-foot, ¼ inch stainless steel column packed with 5% sodium dodecylbenzene sulfonate on Anachrom ABS 70/80 mesh was used at a column temperature at 100–140° C. programmed at 5.6° C./minute. Programming started 5 minutes after injection to 140° C., using a 5 microliter sample size. Range was 100×; attentuation 16× main peak at 64, with Rotometer gas flow settings of hydrogen=7, helium=9, air=7. Injection portion temperature was 270° C., and detector block temperature was 235° C. Results of this analysis are shown on the upper graph of FIG. 2. In said upper graph, elapsed time in terms of minutes is represented by the abscissa. The ordinate of the upper graph illustrates the position of the Recorder at any given time.

Figure 2:
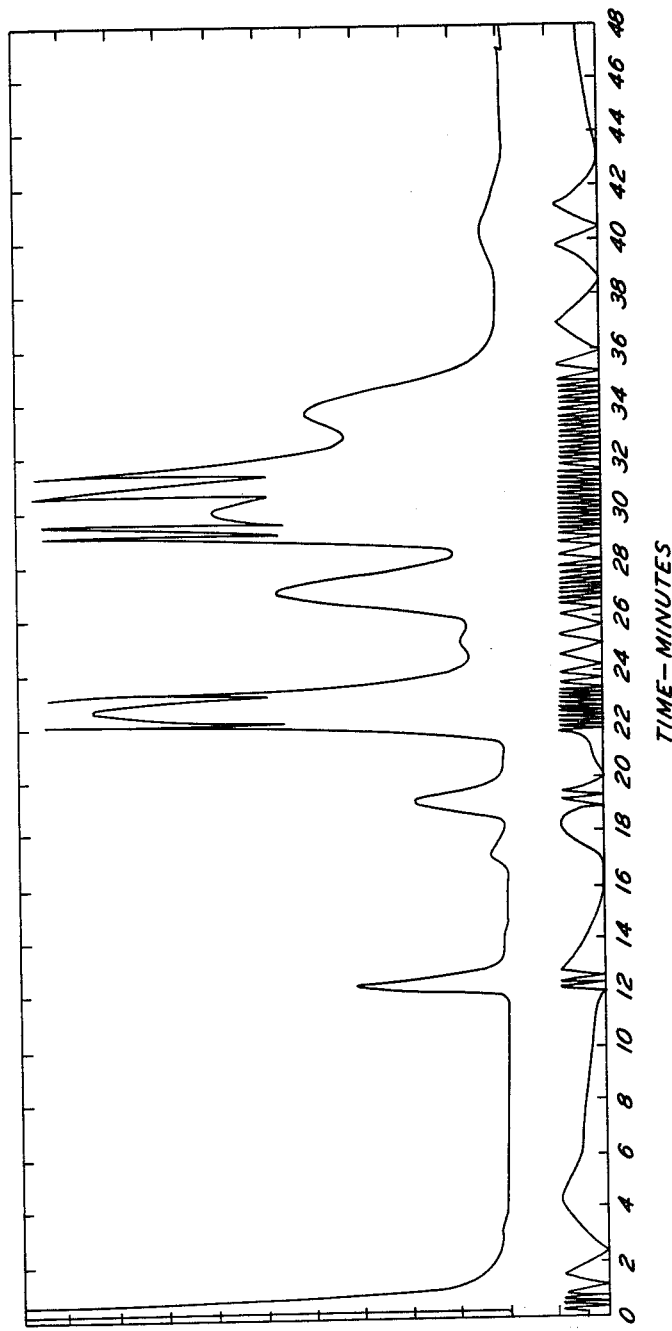
FIG. 2 is a gas chromatograph obtained from a crude, commercial chlorinated nitration admixture of benzoic acid isomers.

The vertical lines of the lower schematic graph of FIG. 2 are simultaneously recorded with the upper graph. The lower graph is used for purposes of calculating the area under the curve of the upper graph in order to arrive at a quantitative determination of the particular components present in the sample being analyzed.

Figure 3:
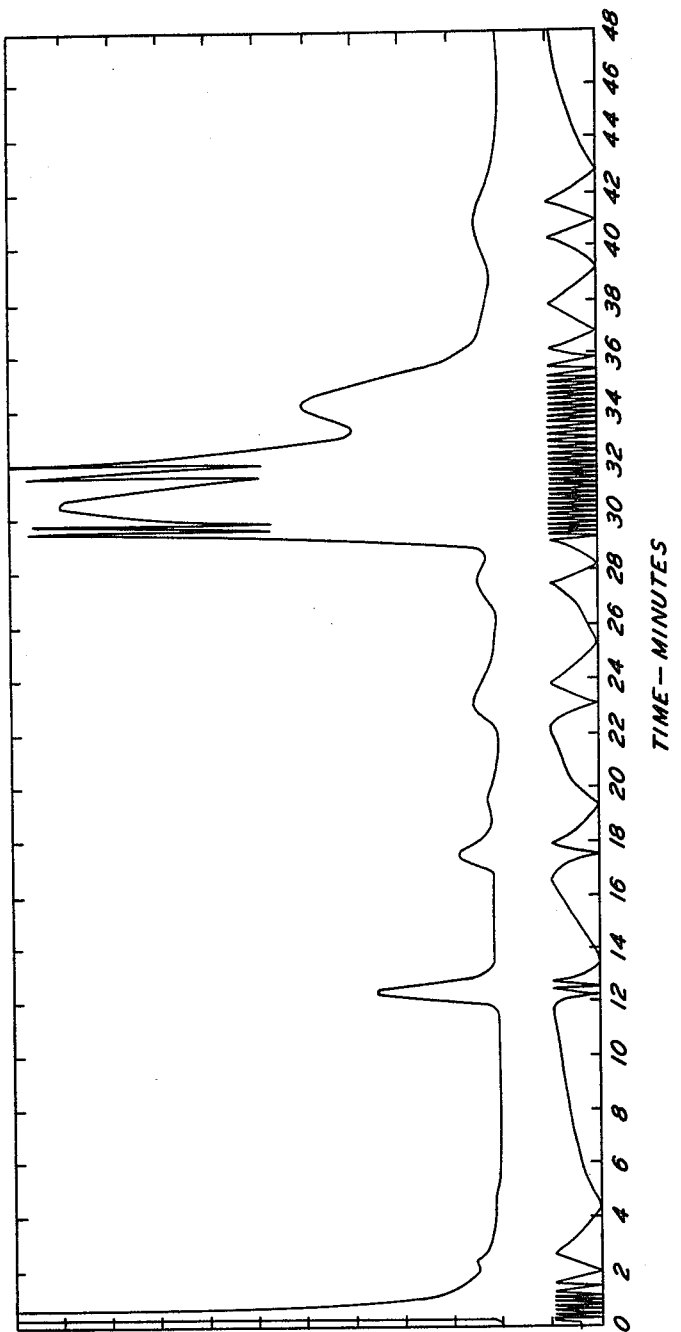
FIG. 3 is a gas chromatograph obtained from the 2,5-dichloro-3-nitrobenzoic acid fraction precipitated at a pH of 2.9 from the process of this invention.
Figure 4:
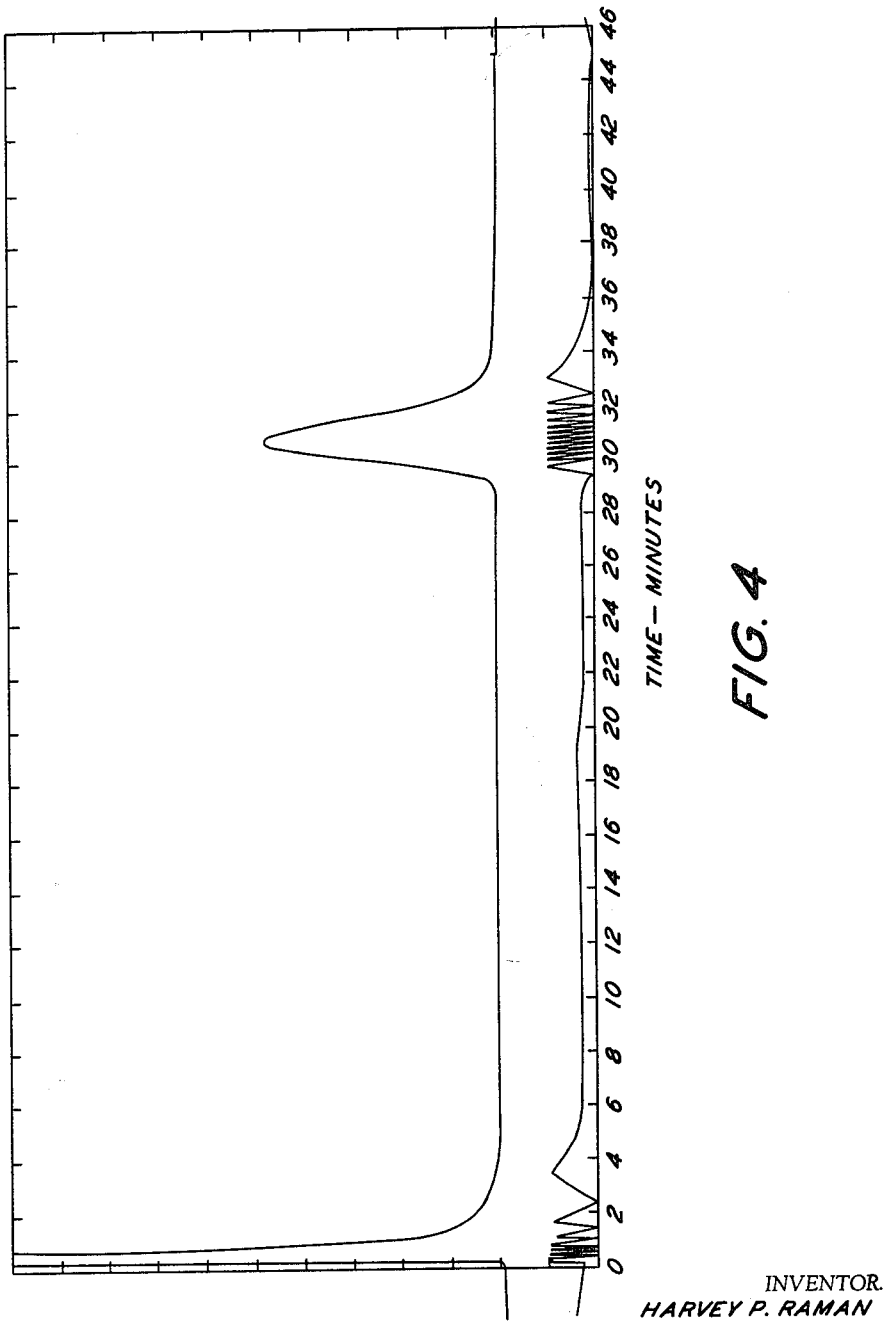
FIG. 4 is a gas chromatograph obtained from a chemically pure (M.P. 220° C.) sample of 2,5-dichloro-3-nitrobenzoic acid.
Figure 5:
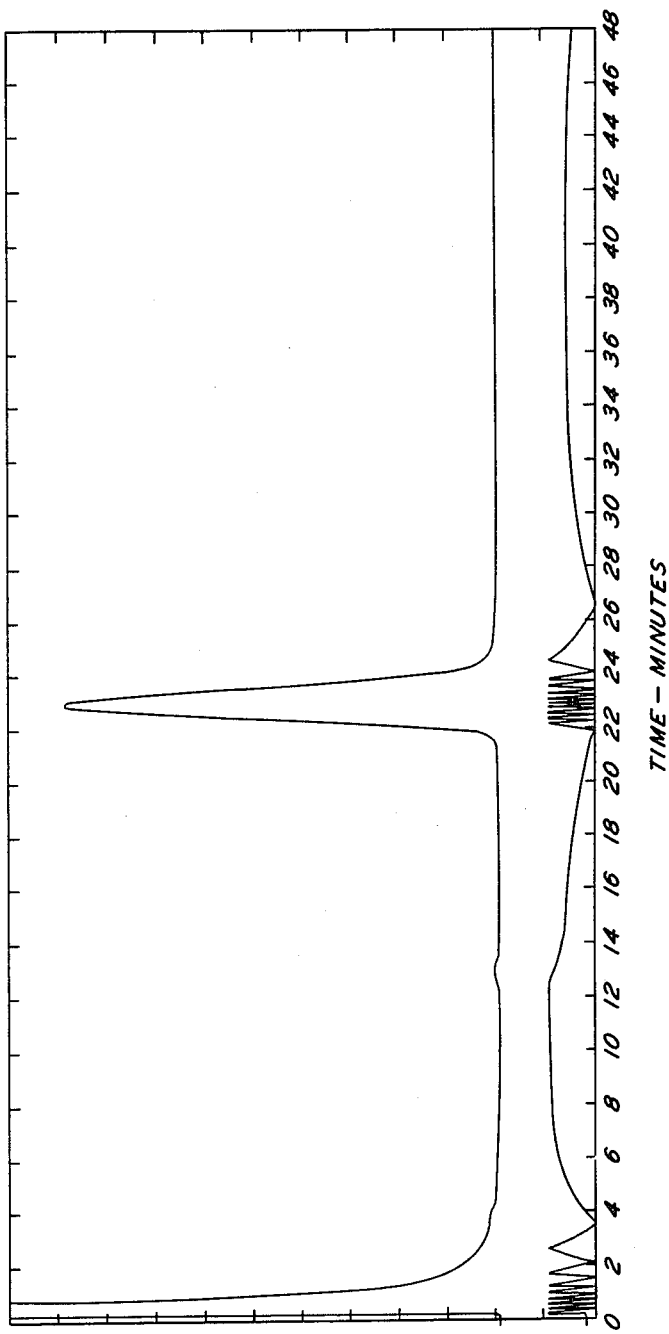
FIG. 5 is a gas chromatograph obtained from a chemically pure (M.P. 141–143° C.) sample of 2,5-dichloro-6-nitrobenzoic acid.

The upper and lower graphs of FIGS. 3, 4 and 5 represent in a similar manner the analysis of the other samples as discussed hereinafter.

Following recovery of the desired 2,5-dichloro-3-nitrobenzoic acid fraction by means of precipitation at a pH of 2.9, a portion of this product was converted to the methyl ester using diazomethane and was then subjected to gas chromatographic analysis under identical conditions as reported above for the crude sample analysis. Results are then shown on FIG. 3 from which it will be observed that only minor amounts of other isomers remain in the product fraction, and that a substantial quantity of the undesirable 2,5-dichloro-6-nitrobenzoic acid isomer has been removed.

FIGS. 4 and 5 represent, respectively, the gas chromatographic analyses obtained from C.P. samples of 2,5-dichloro-3-nitrobenzoic acid, methyl ester, and from 2,5-dichloro-6-nitrobenzoic acid, methyl ester.

In order to illustrate the harmful effects of the 2,5-dichloro-6-nitrobenzoic acid upon desirable economic crops as compared to the selectivity displayed by 2,5-dichloro-3-nitrobenzoic acid, on identical crops, three week old soybean plants were sprayed with dilute solutions of each of these acids and the following comparative observations were recorded from these treatments:

*Table 1*

| Substituted Benzoic Acid | Rate, p.p.m. | Effect |
|---|---|---|
| 2,5-dichloro-3-nitro- | 1 | 0 |
| Do | 5 | 0 |
| Do | 10 | 0 |
| Do | 15 | 0 |
| Do | 20 | 0 |
| 2,5-dichloro-6-nitro- | 0.25 | 2 |
| Do | 0.5 | 3 |
| Do | 1 | 3 |

Key: 0=no formative effect; 1=slight formative effect; 2=moderate formative effect; 3=severe formative effect.

From the foregoing it is apparent that high quality 2,5-dichloro-3-nitrobenzoic acid is obtained from the pH fractional precipitation process of this invention and that such acid as recovered from this process is suitable for use in herbicidal applications even as applied to desirable economic crops.

Obviously many modifications and variations of the present invention are possible in the light of the above teachings. It is, therefore, to be understood that within the scope of the appended claims, the invention may be practiced otherwise than as specifically described.

What is claimed as the invention is:

1. A method for the recovery of 2,5-dichloro-3-nitrobenzoic acid from a crude nitration mixture of chloro-substituted benzoic acids which also includes 3,4-dichloro-6-nitrobenzoic acid and 2,5-dichloro-6-nitrobenzoic acid, comprising dissolving said crude nitration mixture in an aqueous alkaline solution at a pH of at least 10 to form a first precipitate, said alkaline solution having been prepared from a hydroxide selected from the group consisting of sodium hydroxide, potassium hydroxide and ammonium hydroxide, said first precipitate consisting substantially of alkali metal salt of 3,4-dichloro-6-nitrobenzoic acid, removing said first precipitate to leave an alkaline filtrate, acidifying said alkaline filtrate with a mineral acid until a solution pH of from 2 to 4 is obtained and removing therefrom precipitated 2,5-dichloro-3-nitrobenzoic acid.

2. The invention of claim 1 wherein said alkaline solution is prepared on the basis of utilizing from about 1.02 to about 1.2 mols of alkali for each mol of total acids present in said crude nitration mixture.

3. The invention of claim 1 wherein said mineral acid is selected from the group consisting of hydrochloric, nitric, sulfuric and phosphoric acids.

No references cited.